United States Patent
Walters et al.

(10) Patent No.: US 11,302,036 B2
(45) Date of Patent: Apr. 12, 2022

(54) COLOR CONVERSION BETWEEN COLOR SPACES USING REDUCED DIMENSION EMBEDDINGS

(71) Applicant: Capital One Services, LLC, McLean, VA (US)

(72) Inventors: Austin Grant Walters, Savoy, IL (US); Jeremy Edward Goodsitt, Champaign, IL (US); Vincent Pham, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/997,383

(22) Filed: Aug. 19, 2020

(65) Prior Publication Data

US 2022/0058835 A1 Feb. 24, 2022

(51) Int. Cl.
*G06T 9/00* (2006.01)
*G06K 9/62* (2022.01)
*G06T 7/10* (2017.01)
*G06T 7/90* (2017.01)

(52) U.S. Cl.
CPC ............ *G06T 9/002* (2013.01); *G06K 9/6267* (2013.01); *G06T 7/10* (2017.01); *G06T 7/90* (2017.01); *G06T 2207/10024* (2013.01); *G06T 2207/20081* (2013.01); *G06T 2207/20084* (2013.01)

(58) Field of Classification Search
CPC .. G06T 9/002; G06T 7/10; G06T 7/90; G06T 2207/10024; G06T 2207/20081; G06T 2207/20084; G06K 9/6267
See application file for complete search history.

(56) References Cited

U.S. PATENT DOCUMENTS

| | | | |
|---|---|---|---|
| 5,638,496 A * | 6/1997 | Sato | H04N 1/00843 358/1.9 |
| 5,678,033 A | 10/1997 | Moledina et al. | |
| 5,724,450 A | 3/1998 | Chen et al. | |
| 5,818,032 A | 10/1998 | Sun et al. | |
| 5,992,748 A | 11/1999 | Takahashi et al. | |

(Continued)

FOREIGN PATENT DOCUMENTS

| CN | 104899630 A | 9/2015 |
|---|---|---|
| CN | 106447590 A | 2/2017 |

(Continued)

OTHER PUBLICATIONS

"Task-specific color spaces and compression formachine-based object recognition" Technical Disclosure Commons (Year: 2019).*

(Continued)

*Primary Examiner* — Sean T Motsinger
(74) *Attorney, Agent, or Firm* — Kacvinsky Daisak Bluni PLLC

(57) ABSTRACT

Exemplary embodiments may provide an approach to converting multidimensional color data for an image encoded in a first color space into an intermediate form that is a single dimensional value. The exemplary embodiments may then decode the intermediate form value to produce an encoding of the color data that is encoded in a second color space that differs from the first color space. In this manner, the data for the image may be efficiently converted from an encoding in the first color space into an encoding in the second color space.

19 Claims, 9 Drawing Sheets

(56) References Cited

U.S. PATENT DOCUMENTS

| | | | |
|---|---|---|---|
| 6,070,805 A | 6/2000 | Kaufman et al. | |
| 6,119,943 A | 9/2000 | Christy | |
| 6,354,502 B1 | 3/2002 | Hagstrom et al. | |
| 6,572,025 B1 | 6/2003 | Nishikado et al. | |
| 6,590,996 B1 | 7/2003 | Reed et al. | |
| 6,591,009 B1 | 7/2003 | Usami et al. | |
| 6,711,291 B1 | 3/2004 | Stubler et al. | |
| 6,831,682 B1 | 12/2004 | Silverbrook et al. | |
| 6,956,967 B2 | 10/2005 | Gindele et al. | |
| 6,985,252 B1* | 1/2006 | Kubo | H04N 1/6008 345/589 |
| 7,050,065 B1 | 5/2006 | Young | |
| 7,119,838 B2 | 10/2006 | Zanzucchi et al. | |
| 7,170,645 B2 | 1/2007 | Kim et al. | |
| 7,180,629 B1* | 2/2007 | Nishio | H04N 9/735 348/223.1 |
| 7,212,655 B2 | 5/2007 | Tumey et al. | |
| 7,273,175 B2 | 9/2007 | Zhao et al. | |
| 7,471,832 B2 | 12/2008 | Luo et al. | |
| 7,486,802 B2 | 2/2009 | Hougen | |
| 7,649,650 B2 | 1/2010 | Eschbach | |
| 7,804,980 B2 | 9/2010 | Sasaki | |
| 8,045,221 B2 | 10/2011 | Chiba | |
| 8,079,525 B1 | 12/2011 | Zolotov | |
| 8,243,340 B2 | 8/2012 | McDowell et al. | |
| 8,405,780 B1 | 3/2013 | Schaem | |
| 8,450,704 B2 | 5/2013 | Buonassisi et al. | |
| 8,483,479 B2 | 7/2013 | Kunkel et al. | |
| 8,593,476 B2 | 11/2013 | Demos | |
| 8,619,077 B1 | 12/2013 | Cote et al. | |
| 8,665,347 B2 | 3/2014 | Miyawaki et al. | |
| 8,724,847 B2 | 5/2014 | Kanda | |
| 8,836,716 B1 | 9/2014 | Gaddy et al. | |
| 9,111,186 B2 | 8/2015 | Blasinski et al. | |
| 9,230,326 B1 | 1/2016 | Liu | |
| 9,449,578 B2 | 9/2016 | Roux | |
| 9,805,296 B2 | 10/2017 | Loy et al. | |
| 10,496,862 B1 | 12/2019 | Walters et al. | |
| 10,496,909 B1 | 12/2019 | Holman | |
| 10,496,911 B1 | 12/2019 | Walters et al. | |
| 10,504,013 B1 | 12/2019 | Walters et al. | |
| 10,504,230 B1 | 12/2019 | Stahl et al. | |
| 10,509,991 B1 | 12/2019 | Walters et al. | |
| 10,523,420 B1 | 12/2019 | Walters et al. | |
| 10,529,300 B1 | 1/2020 | Walters et al. | |
| 10,534,948 B1 | 1/2020 | Walters et al. | |
| 10,614,635 B1 | 4/2020 | Walters et al. | |
| 10,715,183 B1 | 7/2020 | Walters et al. | |
| 10,726,227 B1 | 7/2020 | Walters et al. | |
| 10,726,319 B1 | 7/2020 | Walters et al. | |
| 10,733,492 B1 | 8/2020 | Walters et al. | |
| 10,762,371 B1 | 9/2020 | Walters et al. | |
| 10,796,122 B1 | 10/2020 | Walters et al. | |
| 10,867,226 B1 | 12/2020 | Walters et al. | |
| 10,878,600 B1 | 12/2020 | Goodsitt et al. | |
| 10,944,914 B1* | 3/2021 | Le | H04N 5/359 |
| 10,977,462 B2 | 4/2021 | Walters et al. | |
| 10,977,535 B2 | 4/2021 | Walters et al. | |
| 10,977,536 B2 | 4/2021 | Walters et al. | |
| 2002/0126328 A1 | 9/2002 | Lehmeier et al. | |
| 2003/0053706 A1 | 3/2003 | Hong et al. | |
| 2003/0228016 A1 | 12/2003 | Shimada | |
| 2003/0228031 A1 | 12/2003 | Rhoads | |
| 2003/0235923 A1* | 12/2003 | Jurik | G01N 21/78 436/169 |
| 2004/0117751 A1 | 6/2004 | Shrowty et al. | |
| 2004/0153649 A1 | 8/2004 | Rhoads et al. | |
| 2004/0182930 A1 | 9/2004 | Nojiri | |
| 2004/0197021 A1 | 10/2004 | Huang et al. | |
| 2004/0246529 A1 | 12/2004 | Pruden et al. | |
| 2005/0006472 A1 | 1/2005 | Verschuur et al. | |
| 2005/0092844 A1 | 5/2005 | Zhang et al. | |
| 2005/0128491 A1* | 6/2005 | Kubo | H04N 1/6022 358/1.1 |
| 2005/0167505 A1 | 8/2005 | Kim et al. | |
| 2005/0169496 A1 | 8/2005 | Perry | |
| 2006/0097062 A1 | 5/2006 | Cheong et al. | |
| 2006/0098241 A1 | 5/2006 | Cheong et al. | |
| 2007/0046956 A1 | 3/2007 | Burlingame | |
| 2007/0084933 A1 | 4/2007 | Zhang et al. | |
| 2007/0138286 A1 | 6/2007 | Kamijoh et al. | |
| 2007/0229531 A1 | 10/2007 | Park et al. | |
| 2008/0151280 A1 | 6/2008 | Kamijo et al. | |
| 2008/0261687 A1 | 10/2008 | Gatzios | |
| 2008/0284793 A1 | 11/2008 | Young | |
| 2009/0028382 A1 | 1/2009 | Erol | |
| 2010/0034380 A1 | 2/2010 | Lee | |
| 2010/0066874 A1 | 3/2010 | Ishiga | |
| 2010/0200658 A1 | 8/2010 | Olmstead et al. | |
| 2010/0245857 A1 | 9/2010 | Plummer | |
| 2011/0127371 A1 | 6/2011 | Zhao et al. | |
| 2011/0186625 A1 | 8/2011 | Mangione-Smith | |
| 2011/0233284 A1 | 9/2011 | Howard | |
| 2012/0075484 A1 | 3/2012 | Kawamoto et al. | |
| 2012/0176409 A1 | 7/2012 | Noge | |
| 2012/0208592 A1 | 8/2012 | Davis et al. | |
| 2012/0298753 A1 | 11/2012 | Zolotov | |
| 2012/0329553 A1 | 12/2012 | Gagner et al. | |
| 2013/0026241 A1 | 1/2013 | Sakahashi et al. | |
| 2013/0092738 A1 | 4/2013 | Blasinski et al. | |
| 2013/0343645 A1 | 12/2013 | Dalal et al. | |
| 2014/0027516 A1 | 1/2014 | Fushiki | |
| 2014/0119645 A1 | 5/2014 | Zimet-Rubner et al. | |
| 2014/0119647 A1 | 5/2014 | Cheong et al. | |
| 2014/0270512 A1 | 9/2014 | Mesh-Iliescu et al. | |
| 2015/0104184 A1 | 4/2015 | Jeffrey | |
| 2015/0156477 A1 | 6/2015 | Lee et al. | |
| 2015/0243200 A1 | 8/2015 | Pan | |
| 2015/0294460 A1 | 10/2015 | Satish et al. | |
| 2016/0062612 A1 | 3/2016 | Chum et al. | |
| 2016/0098585 A1 | 4/2016 | Sempere et al. | |
| 2016/0104310 A1 | 4/2016 | Van Gorp et al. | |
| 2016/0148083 A1 | 5/2016 | Osborne et al. | |
| 2016/0148089 A1 | 5/2016 | Boday et al. | |
| 2016/0292486 A1 | 10/2016 | Prusik et al. | |
| 2016/0335751 A1 | 11/2016 | Sidar et al. | |
| 2017/0061186 A1 | 3/2017 | Laurent et al. | |
| 2017/0061582 A1 | 3/2017 | Lim et al. | |
| 2017/0061584 A1 | 3/2017 | Lim et al. | |
| 2017/0076127 A1 | 3/2017 | Arce et al. | |
| 2017/0076191 A1 | 3/2017 | Feng | |
| 2017/0169267 A1 | 6/2017 | Guenter et al. | |
| 2017/0185880 A1 | 6/2017 | Lin et al. | |
| 2017/0200035 A1 | 7/2017 | Teraura | |
| 2017/0229052 A1 | 8/2017 | Veernapu et al. | |
| 2017/0243041 A1 | 8/2017 | Arce et al. | |
| 2017/0249712 A1 | 8/2017 | Branscomb et al. | |
| 2017/0309104 A1 | 10/2017 | Lewis et al. | |
| 2017/0316297 A1 | 11/2017 | Lee | |
| 2017/0318301 A1 | 11/2017 | Li et al. | |
| 2017/0339430 A1* | 11/2017 | Kalevo | H04N 1/64 |
| 2017/0344776 A1 | 11/2017 | Sharma et al. | |
| 2017/0351893 A1 | 12/2017 | Schneider et al. | |
| 2018/0302623 A1 | 10/2018 | Jia et al. | |
| 2018/0350180 A1 | 12/2018 | Onischuk | |
| 2018/0365462 A1 | 12/2018 | Gutfinger et al. | |
| 2018/0373950 A1 | 12/2018 | Gong | |
| 2019/0018994 A1 | 1/2019 | Teraura | |
| 2019/0066338 A1 | 2/2019 | Perlman et al. | |
| 2019/0108618 A1* | 4/2019 | Hwang | G06T 3/4015 |
| 2019/0122440 A1 | 4/2019 | Barros et al. | |
| 2019/0138867 A1 | 5/2019 | Vander Aa et al. | |
| 2019/0205668 A1* | 7/2019 | Noda | G08G 1/166 |
| 2019/0295712 A1 | 9/2019 | Bommarito et al. | |
| 2019/0384955 A1 | 12/2019 | Frieser et al. | |
| 2020/0226762 A1 | 7/2020 | Milovanovic et al. | |
| 2020/0302137 A1 | 9/2020 | Walters et al. | |
| 2020/0366893 A1 | 11/2020 | Leleannec et al. | |
| 2021/0035331 A1* | 2/2021 | Xie | H04N 1/6027 |
| 2021/0133522 A1* | 5/2021 | Chang | G06F 16/51 |
| 2021/0158096 A1* | 5/2021 | Sinha | H04N 9/04551 |
| 2021/0200501 A1* | 7/2021 | Stankoulov | G06F 3/1462 |
| 2021/0200969 A1 | 7/2021 | Walters et al. | |

(56) References Cited

U.S. PATENT DOCUMENTS

| | | | |
|---|---|---|---|
| 2021/0201098 A1 | | 7/2021 | Walters et al. |
| 2021/0201099 A1 | | 7/2021 | Walters et al. |
| 2021/0304389 A1* | | 9/2021 | Li .................... G06K 9/627 |

FOREIGN PATENT DOCUMENTS

| | | | |
|---|---|---|---|
| EP | 0954801 | A1 | 11/1999 |
| JP | 2007287004 | A | 11/2007 |
| JP | 2012141729 | A | 7/2012 |
| JP | 2012181591 | A | 9/2012 |
| KR | 101445502 | B1 | 9/2014 |
| KR | 101573655 | B1 | 12/2015 |
| KR | 20170038468 | A | 4/2017 |
| WO | 0124106 | A1 | 4/2001 |
| WO | 2009121605 | A2 | 10/2009 |
| WO | 2014140893 | A2 | 9/2014 |
| WO | 2016111823 | A2 | 7/2016 |
| WO | 2016170041 | A1 | 10/2016 |
| WO | 2018002944 | A1 | 1/2018 |

OTHER PUBLICATIONS

Walters, Austin G., "Edge Detection in Computer Vision," Metacortex Inc. [online] Feb. 17, 2015 [retrieved on Mar. 18, 2019]. Retrieved from Internet URL: https://austingwalters.com/edge-detection-in-computer-vision/, 22 pages.

Walters, Austin G., "Chroma Tags: An Accurate, Robust, and Fast Visual Fiducial System" [online] May 15, 2015 [retrieved on Mar. 18, 2019], Retrieved from Internet URL: https://austingwalters.com/chromatags/, 13 pages.

Author Unknown., "Chroma Tags", GitHub [online] 2018 [retrieved on Mar. 18, 2019]. Retrieved from Internet URL: https://github.com/lettergram/chromatag, 3 pages.

Author Unknown., "Chroma Tag: A Colored Marker and Fast Detection Algorithm", GitHub [online] 2018 [retrieved on Mar. 18, 2019], Retrieved from Internet URL: https://github.com/CogChameleon/ChromaTag, 3 pages.

Author Unknown., "H.264 is Magic", SidBala [online] Nov. 2, 2016 [retrieved on Mar. 18, 2019]. Retrieved from internet URL: https://sidbala.com/h-264-is-magic/, 20 pages.

DeGol, Joseph, et al., "ChromaTag: A Colored Marker and Fast Detection Algorithm", 2017 IEEE International Conference on Computer Vision, pp. 1481-1490, IEEE Computer Society (2017) (Year: 2017).

Cho et al., "A Real-Time Histogram Equalization System with Automatic Gain Control Using FPGA", KSII Transactions on Internet and Information Systems, vol. 4, No. 4, 23 pages, Aug. 2010.

Clark, "A TeleComputer", Computer Graphics Proceedings, Annual Conference Series, Siggraph, 26(2):19-23, Jul. 1, 1992.

International Search Report and Written Opinion for International Application No. PCT/US2020/027220 dated Jun. 18, 2020, 15 pages.

International Search Report and Written Opinion for International Application No. PCT/US2020/022946 dated Jun. 25, 2020, 11 pages.

International Search Report and Written Opinion for International Patent Application No. PCT/US2020/022920 dated Jul. 7, 2020, 11 pages.

Sudhakar, "Histogram Equalization", Published on Jul. 9, 2017. Retrieved from Internet URL: <https://towardsdatascience.com/>, 5 pages.

International Search Report and Written Opinion for International Patent Application No. PCT/US2020/022811 dated Aug. 17, 2020, 19 pages.

International Search Report and Written Opinion for International Patent Application No. PCT/US2020/029778 dated Jul. 29, 2020, 16 pages.

Wang Yu-Mei et al., "Secured Graphic QR Code with Infrared Watermark", 2018 IEEE International Conference of Applied System Inventions (ICASI), pp. 690-693, Apr. 13, 2018.

International Search Report and Written Opinion for International Patent Application No. PCT/US2020/022815 dated Aug. 17, 2020, 20 pages.

* cited by examiner

COLOR CONVERSION BETWEEN COLOR SPACES USING REDUCED DIMENSION EMBEDDINGS

BACKGROUND

Color data for two dimensional images is typically encoded on a pixel by pixel basis. Thus, color data is encoded for the pixels that make up the images. For three dimensional images, the color data is encoded for the voxels that make up the image. How the color data is represented is dependent on the color space used for the encoding. The color space is a model that describes the colors of the elements of an image (e.g., pixels or voxels) as tuples of numbers. For example, in the RGB color space, the color is represented as a combination of red, green and blue color components. Each color for an element of an image is represented by a tuple of red, green and blue color component values, with each value being in the range between 0 and 255.

Color spaces differ in their representation of that color data. For instance, the CIELAB or LAB color space represents color as three values: L for the Luminance/Lightness and Alpha (A) and Beta (B) for the green-red and blue-yellow color components, respectively. The LAB color space is typically used when converting from RGB color space model into Cyan-Magenta-Yellow-Black (CMYK) color space. For some images, representing its color data in the LAB color space model provides better edge detection results than other color spaces, including the RGB model.

It may be useful sometimes to convert an image from a source color space to a target color space. For instance, it may be easier to perform object recognition or edge detection in the target space rather than in the source color space. Unfortunately, since image data can be quite large, the computational cost and the memory requirements for performing such color space conversion may be onerous.

SUMMARY

In accordance with an exemplary embodiment, a method is performed wherein a computing device converts multi-dimensional color data encoded in a first color space for a set of pixels in an image into a single dimensional value for each pixel in the set of pixels. The single dimensional values for the pixels in the set of pixels are provided as input into at least a portion of a neural network. With the at least a portion of the neural network, the single dimensional color values of the pixels in the set of pixels are converted into multi-dimensional color values in a second color space that is different than the first color space to produce a representation of the set of pixels in the second color space.

The converting of the multi-dimensional color data may be performed by a neural network. The method may further include training the neural network to perform the converting of the multi-dimensional color data. The neural network used in the converting of the multi-dimensional color data may be part of the neural network that converts the single dimensional color values. The neural network may be a convolutional variational autoencoder. The first color space may be the RGB color space and the second color space is the LAB color space. The first color space or the second color space may be one of an RGB color space, a LAB color space, an HSV color space, a CMYK color space, a YUV color space, a HSL color space, an ICtCp color space or a CIE color space. The multi-dimensional color values in the second color space may be compressed relative to the multidimensional color values in the first color space. The set of pixels may constitute all or substantially all of the pixels of the image.

In accordance with an exemplary embodiment, a method is performed. Per the method, a neural network executes on one or more computing devices and converts multi-dimensional color data encoded in a first color space for a set of pixels in an image into a single dimensional value for each pixel in the set of pixels. An image processing operation is performed on the single dimensional values for the set of pixels.

The image processing operation may be one of image segmentation, image classification, object classification, image filtering or image enhancement. The image processing operation may produce a modified version of the single dimensional values. The method may further comprise converting the modified version of the single dimensional values into multidimensional values in a second color space. The image processing operation may be segmentation and wherein the method further comprises outputting a likely segmentation of the image. The image processing operation may be image classification or object classification and a likely classification of the image or a likely classification of an object in the image may be output. The method may be performed by the neural network.

In accordance with an exemplary embodiment, a non-transitory computer-readable storage medium stores computer-executable instructions for execution by a processor. The instructions cause the processor to receive a set of image color data for an image encoded in a first color space and create an embedded representation of the set of image color data in a latent space with a neural network. A first decoder is trained to convert a representation of the set of image color data in a second color space from the embedded representation. A second decoder is trained to convert a representation of the set of image color data in a third color space from the embedded representation.

Instructions for using the first decoder to convert the representation of the set of image color data in the second color space from the embedded representation may be stored on the storage medium. Instructions for using the second decoder to convert the representation of the set of image color data in the third color space from the embedded representation may be stored on the storage medium. The embedded representation may be a representation of less data dimensionality than the received set of image color data. The embedded representation may have color data of a single dimension.

DETAILED DESCRIPTION

Figure 1A:
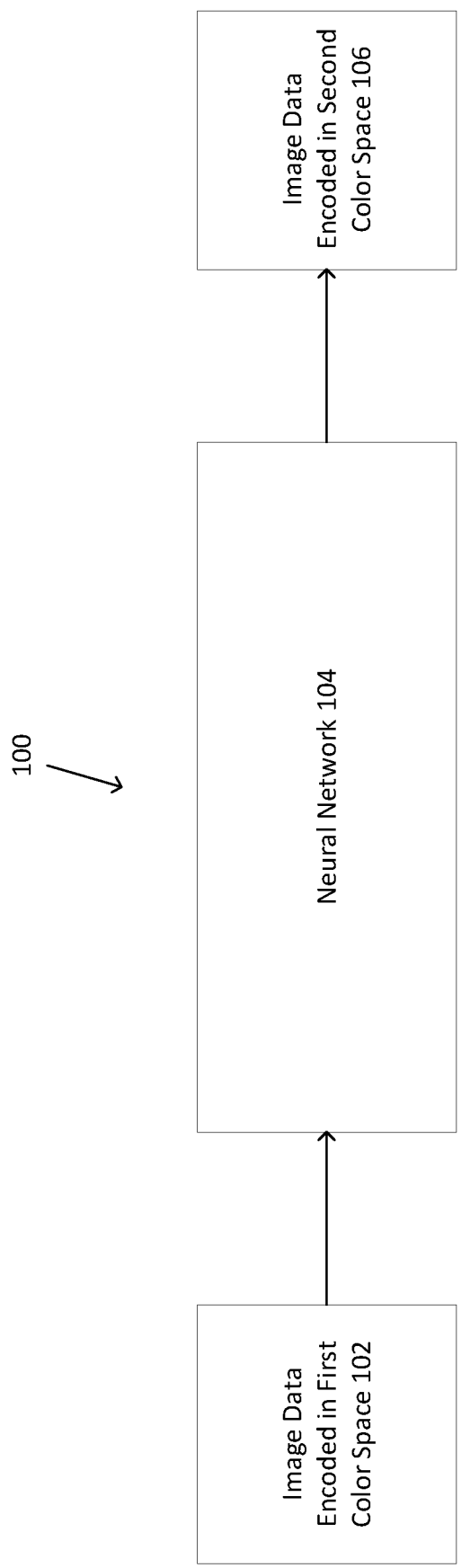
FIG. 1A depicts a block diagram of an illustrative color conversion system for an exemplary embodiment.

Exemplary embodiments may provide an approach to converting multidimensional color data for an image encoded in a first color space into an intermediate form that is a single dimensional value. The exemplary embodiments may then decode the intermediate form value to produce an encoding of the color data that is encoded in a second color space that differs from the first color space. In this manner, the data for the image may be efficiently converted from an encoding in the first color space into an encoding in the second color space. The reduction of the dimensionality of the data in the intermediate form reduces the memory requirements and computational resources needed for the conversion. The conversion may be performed more quickly than conventional conversion approaches that do not reduce the dimensionality of the intermediate form. This model may be used to create embeddings. Other models may be built quickly off the embeddings (similar to text embeddings, see word2vec, glove, etc.). This can improve model accuracy and make models more transferable between domains.

In the exemplary embodiments, the conversion approach may be performed by a neural network. The neural network may receive an encoding of the image data in the first color space as input. The neural network may process the input to produce an embedding in a latent space. The embedding may be a single dimensional value, whereas the input may be a multidimensional value. The portion of the neural network that performs the encoding may be viewed as an encoder. The neural network also may include a decoder that decodes the single dimensional embedding into a multidimensional representation of the color data for the image in the second color space. The neural network may be, for example, a convolutional variational autoencoder or in particular, a multi-modal convolutional variational autoencoder.

The neural network may be trained to realize different encodings. For example, the neural network may be trained to generate an embedding in the latent space from color data for an image encoded in the RGB space, encoded in the LAB space, encoded in the CMYK space, etc. Thus, a number of different encoders may be realized and used as needed, depending on the input. Similarly, the decoding may decode the embedding into color values in the RGB space, in the LAB space, in the CMYK space, etc. Thus, a number of different decoders may be realized and used as needed, depending on the desired output.

The embedding need not be converted directly into an output encoded in a different color space. Image processing operations may be performed on the embeddings for an image and then the resulting processed representation may be used to generate the output in the desired color space. The image processing operations may include, for example, image segmentation, image filtering, image enhancement, image or object classification or other operations.

The neural network is trained on color data for images to learn how to encode the embeddings in the latent space. The neural network also is trained to produce the color data outputs in different color spaces from the embeddings. The training may entail having the neural network process a large amount of training data, such as from a library of image data.

FIG. 1A depicts an illustrative color space conversion system 100 that is suitable for an exemplary embodiment. In the color space conversion system 100. Image data encoded in a first color space 102 is input into a neural network 104 for processing. The neural network 104 processes the image data encoded in the first color space 102 to convert the data into image data encoded in a second color space 106, which is output from the neural network 104. The first color space and the second color space differ. Examples of color spaces include but are not limited to a RGB color space, a LAB color space, a CMYK color space, a XYZ color space, a HSV color space, a YUV color space, a HSL color space, an ICtCp color space or a CIE color space.

Figure 1B:
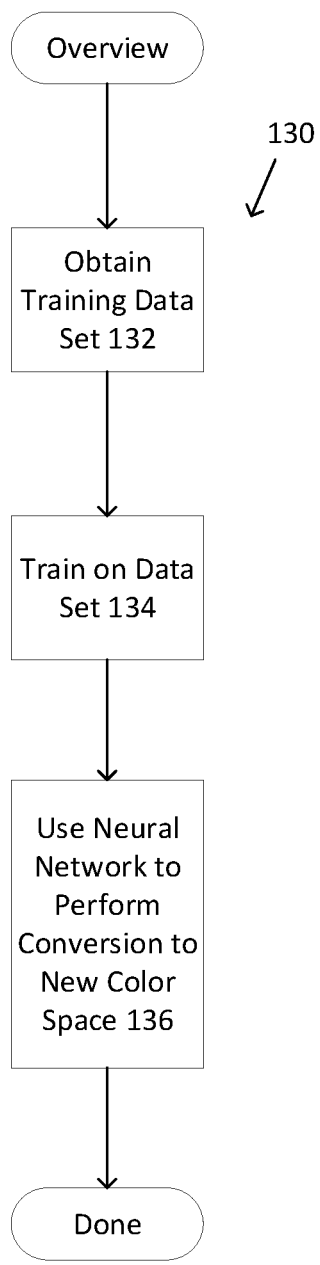
FIG. 1B depicts a flowchart of illustrative steps that may be performed to convert between color spaces using a neural network in an exemplary embodiment.

FIG. 1B provides a flowchart 130 of illustrative steps in the color space conversion process using a neural network in an exemplary embodiment. First, a training set of data is obtained (132). The training set may include image data in input color spaces and the proper conversion of the image data into converted color spaces. The training set preferably is large and diverse so as to ensure that the neural network 104 is properly and fully trained. The neural network is trained on the training set (134). During training, the neural network 104 processes the input image data in the training set and converts the image data into image data encoded in a target color space. The resulting conversion is compared to the correct conversion, and the settings of the nodes in the neural network 104 are adjusted to reduce the error and improve the result based on the comparison. Once the neural network 104 is trained, the neural network 104 is used to perform color conversion to the target color space (136).

Figure 2A:
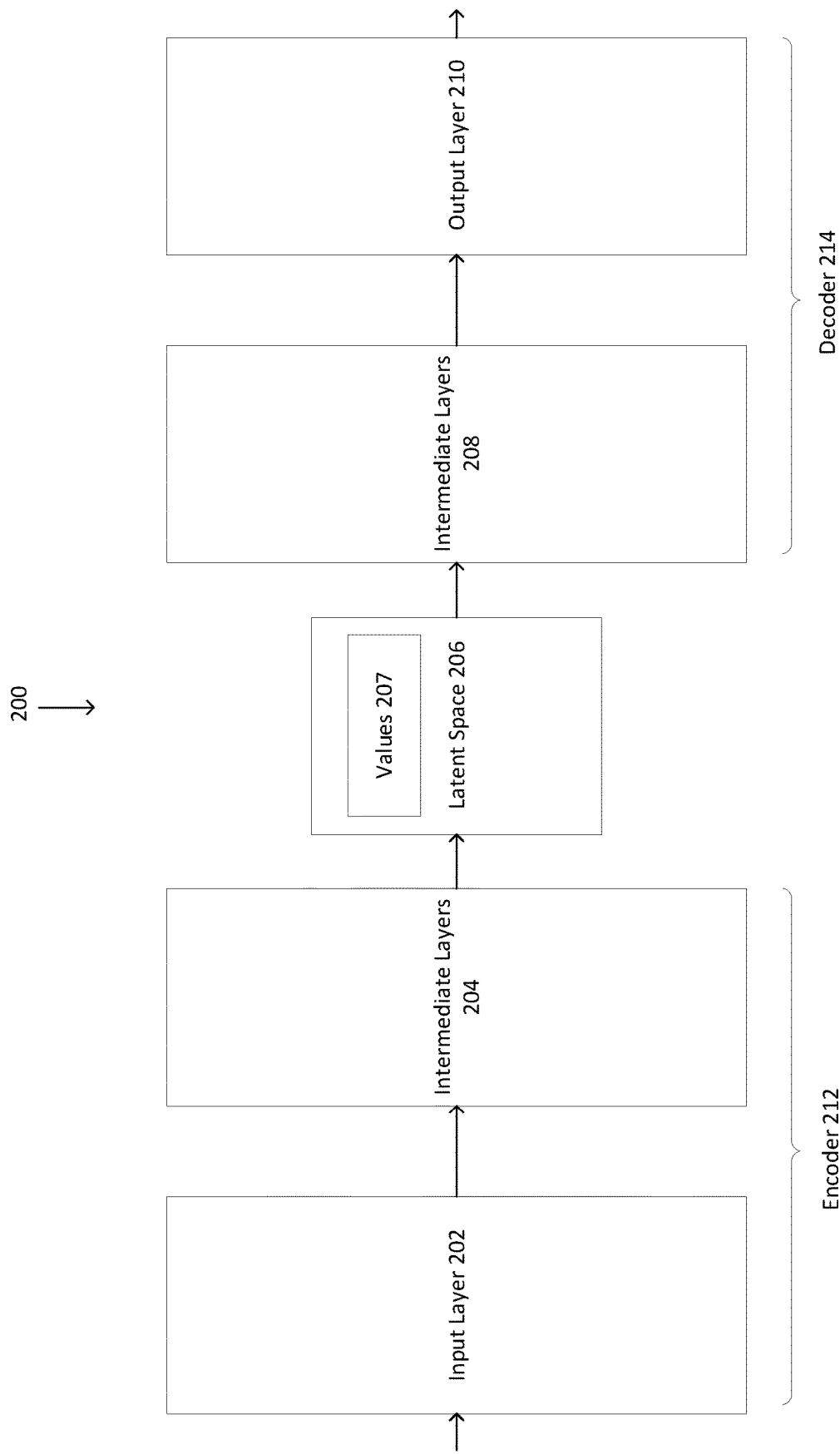
FIG. 2A depicts an illustrative neural network for use in an exemplary embodiment.
Figure 2B:
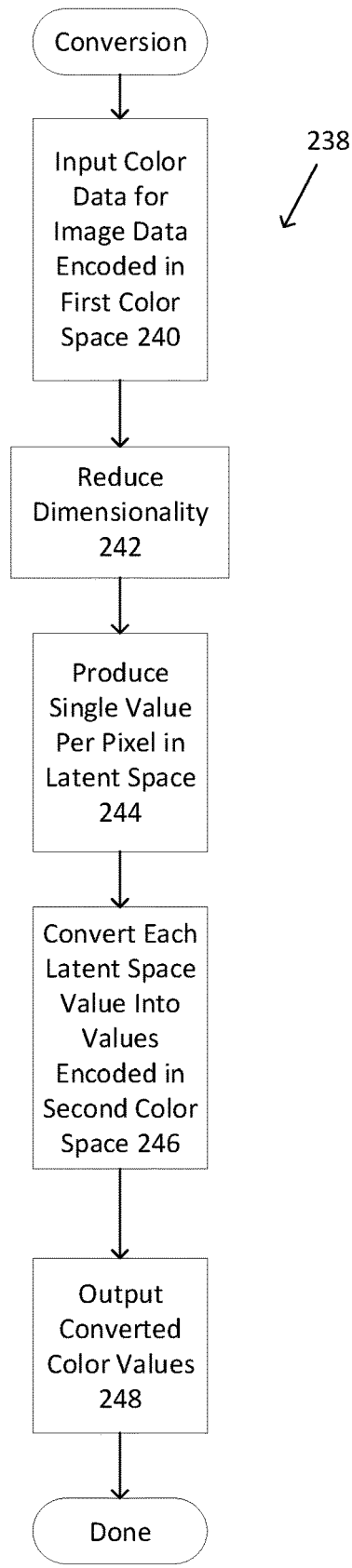
FIG. 2B depicts a flowchart of illustrative steps for performing color conversion in an exemplary embodiment.

FIG. 2A depicts a block diagram of an illustrative neural network 200 for an exemplary embodiment. The neural network 200 may be a variational auto-encoder. The neural network 200 is trained on images that start in a source color space and has multiple target color spaces for the output. The operation of the neural network 200 will be described with reference to the flowchart 238 of FIG. 2B. The neural network 200 may include an input layer 202 for receiving input. In the exemplary embodiments, the input may be color data for an image encoded in a first color space (240). The input is then processed by intermediate layers 204, which may include convolutional layers, sparse convolutional layers, pooling layers and the like. These intermediate layers 204 perform the encoding operation on the input. The intermediate layers 204 reduce the dimensionality of the input (242). This reduction in dimensionality may be performed by sparse convolutional or pooling layers. The intermediate layers 204 produce a single value per input element (e.g., pixel, voxel, etc.) (244). Thus, the input layer 202 and the intermediate layers act as an encoder 212 for encoding values 207 in a latent space 206. The values are the embeddings, and the latent space is a representation of compressed data in which similar data points are closer together in space.

The intermediate layers 208 may process the values 207 to produce the color data values encoded in the second color space, which differs from the first color space. In particular, each of the values 207 in the latent space is decoded to produce color values for elements of an image in the second color space (246). The dimensionality of the resulting color data values in the second color space may be expanded relative the values 207 in the latent space 206. The intermediate layers 208 may include deconvolutional layers that increase dimensionality. The resulting converted color data is then output by the output layer 210 (248). The intermediate layers 208 and the output layer 210 form a decoder 214 hence form a decoder that decode the values 207 in the latent space to produce a reconstructed image encoded in the second color space.

Figure 3:
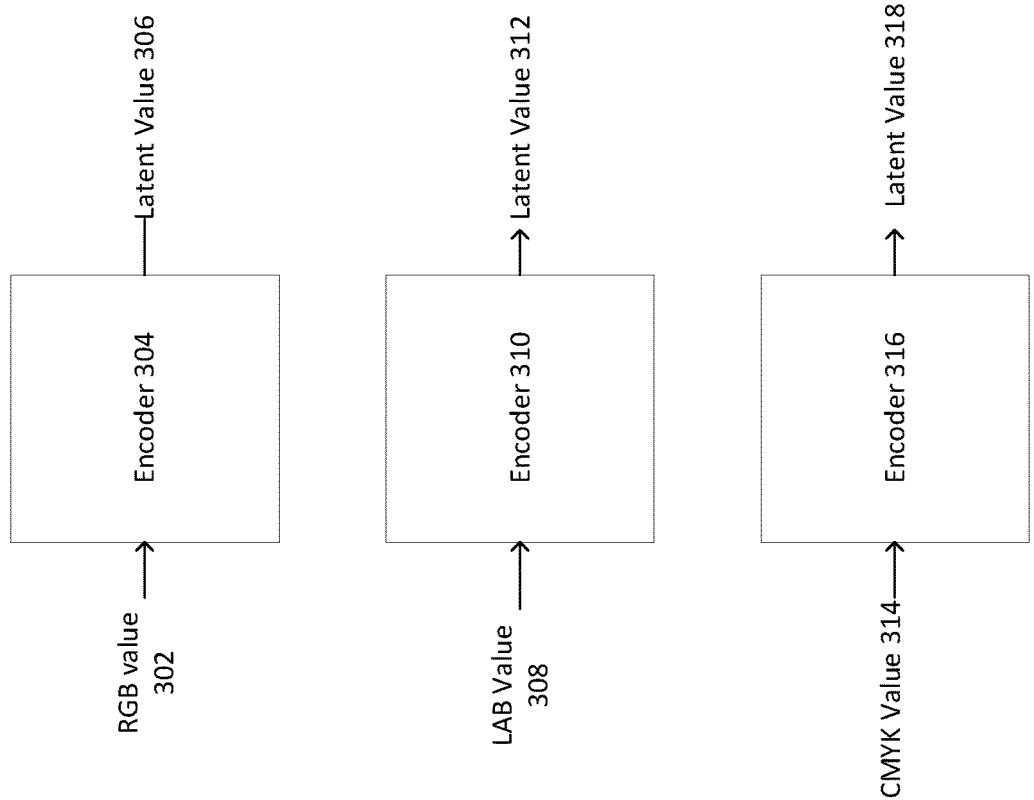
FIG. 3 depicts a block diagram of illustrative encoders.

The neural network 200 need not be limited to input encoded in a particular color space; rather the neural network 200 may be able to encode input color data for an image encoded in different color spaces. For example, as shown in FIG. 3, encoders may be trained and used for encoding from different color spaces into values 207 the latent space 206. For example, an encoder 304 may receive input color data for an image encoded in the RGB color space (i.e., an RGB value 302) and produce a latent value 306 (i.e., an embedding). Similarly, an encoder 310 may receive a LAB value 308 input (i.e., color data for an image encoded in the LAB color space) and convert it into a latent value 312. Likewise, an encoder 316 receives a CMYK value 314 and produces an output latent value 318. These examples are illustrative and not intending to be limiting or exhaustive. Once the neural network 200 has the various encoders 304, 310 and 316, the neural network may choose which encoder to use based on the input.

Figure 4:
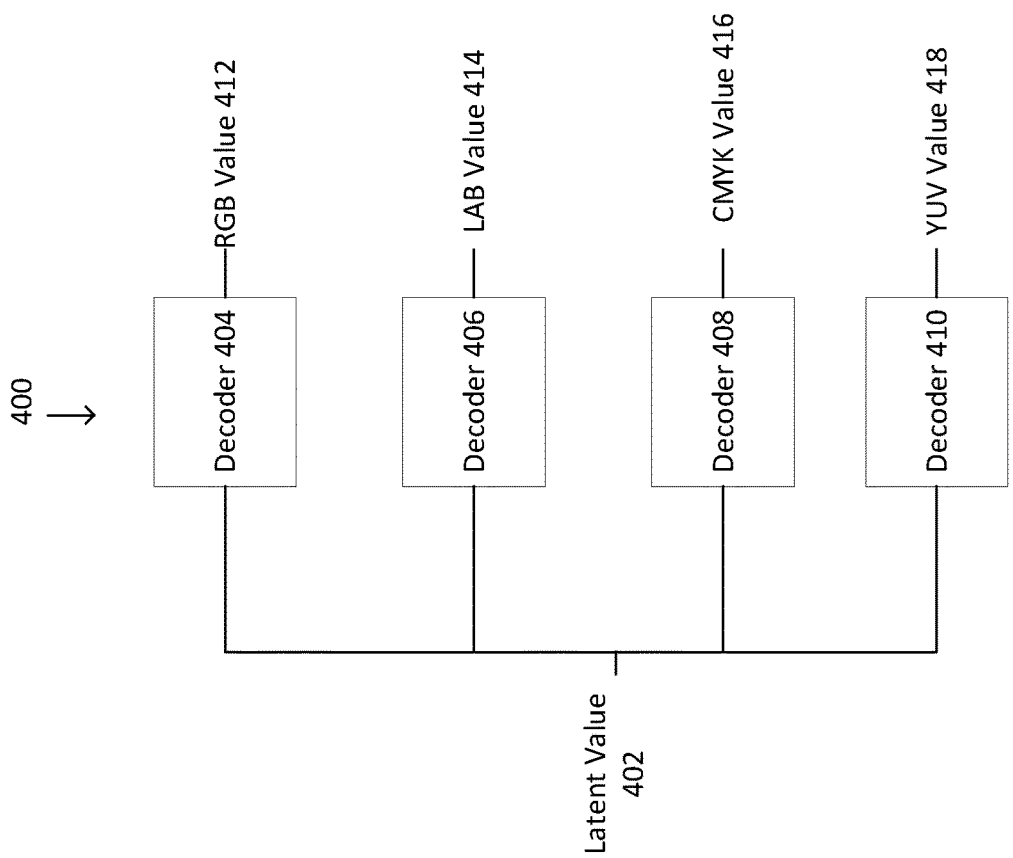
FIG. 4 depicts a block diagram of illustrative decoders.

The neural network may train and use a number of different decoders as well. FIG. 4 shows an example where there are four decoders 404, 406, 408 and 410 that may be used to decode a latent value 402 into different respective color space values. For instance, decoder 404 outputs an RGB value 412, decoder 406 outputs a LAB value, decoder 408 outputs a CMYK value and decoder 410 outs a YUV value. Decoders may also be trained and used that produce outputs encoded in other color spaces. Depending on the desired color space output, the neural network may choose the appropriate decoder.

The neural network 200 thus may mix and match the encoders and decoders based on the input and desired output. For example, encoder 304 may be paired with decoder 406 to convert an RGB input into a LAB output, or encoder 310 may be paired with decoder 410 to convert a LAB input into an YUV output. The neural network may be multimodal to accommodate these numerous options.

Figure 5:
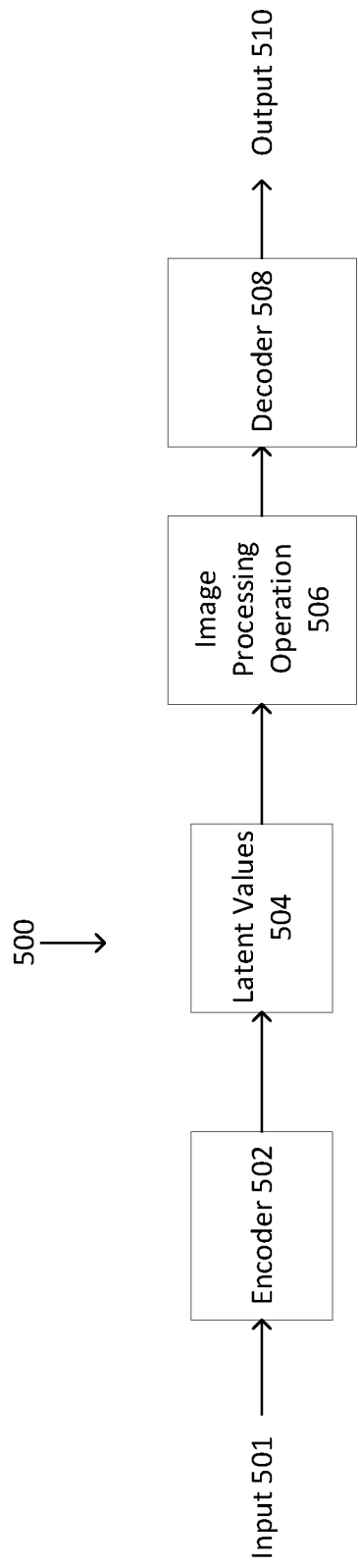
FIG. 5 depicts a block diagram where in an image processing operation is performed on values in a latent space.

The above discussion has focused on instances where the values 207 in the latent space 206 are directly converted into values encoded in the second color space without any intervening processing. FIG. 5 depicts an arrangement 500 in which intervening processing occurs. In FIG. 5, input color data for an image encoded in a first color space is input to encoder 502. The encoder is part of a neural network 200. The encoder 502 encodes the input 501 into latent values 504. At least one image processing operation 506 is performed on the latent values 504. The processed latent values are passed to decoder 508, which produces output color data 510 for an image encoded in a second color space. The image processing operations may be performed more quickly and/or consuming less computational or memory resources due to the compressed nature of the latent values relative to the input 501.

Figure 6:
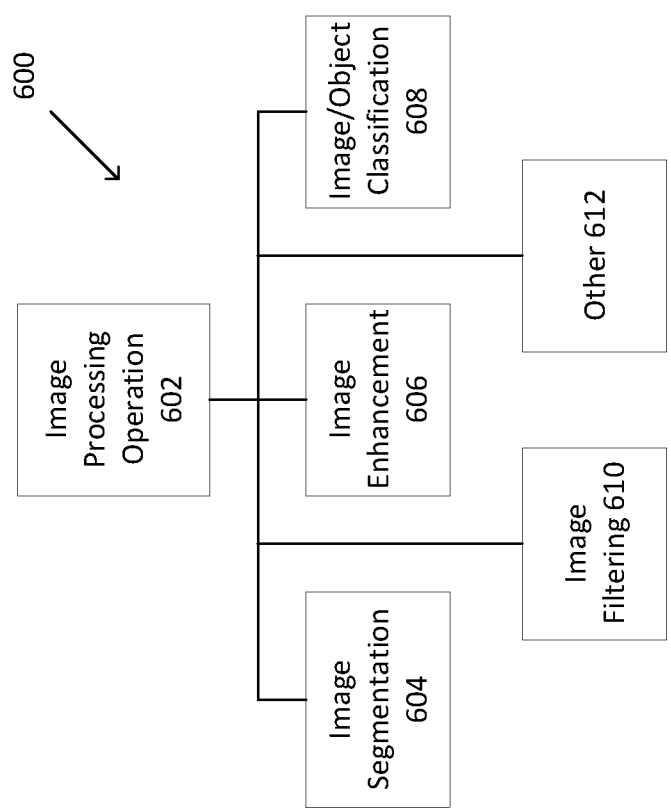
FIG. 6 depicts a diagram of possible image processing operations.

FIG. 6 depicts a diagram 600 of different image processing operations 602 that may be performed in 506. Image segmentation 604 may be performed. Image segmentation 604 partitions a digital image into segments (e.g., sets of pixels) that are useful in locating objects and boundaries in the image. Image enhancement 606 may be performed. Image enhancement may remove noise, sharpen the image and/or brighten the image, for example. Image or object classification 608 may be performed. For example, the identity of objects in an image (e.g., a hat) may be determined or the identity of what is depicted may be determined (e.g., the image is of a horse). Image filtering 610 may be performed and other operations 612 may be performed.

It should be appreciated that the image processing operation 506 need not be performed before decoding. In some exemplary embodiments, the image processing operation 506 is better performed in the second color space. As such, the image processing operation 506 is performed on the output in the second color space. For example, it may be easier to detect objects in the LAB color space rather than the RGB color space.

Figure 7:
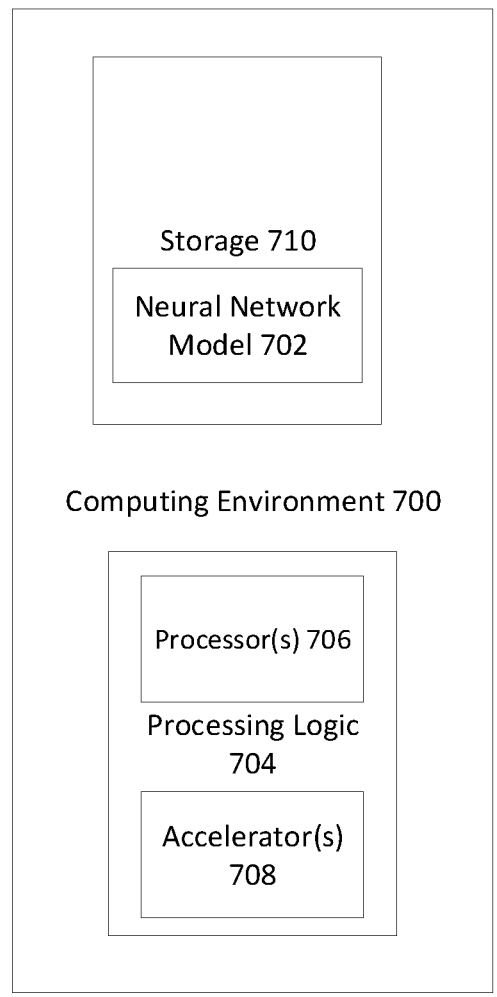
FIG. 7 depicts a block diagram of a computing environment suitable for an exemplary embodiment.

FIG. 7 depicts a computing environment 700 suitable for practicing the exemplary embodiments. The computing environment 700 may include a neural network model 702 for implementing the neural network used in the color conversion. The neural network model 702 may be implemented in software executed by processing logic 704. The processing logic 704 may include one or more processors 706, such as central processing units (CPUs), graphics processing units (GPUs), application specific integrated circuits (ASICs) or field programmable gate arrays (FPGAs). The processors 706 may each include multiple cores or multiple interconnected processing units. The processing logic may include one or more accelerators 708. The accelerators may include circuitry and custom hardware for speeding the execution of the neural network model 702. The custom hardware may include a processor optimized for handling neural network operations. The processing logic may be contained in a single computer, like a personal computer (PC) or a server, or may be spread across multiple computers, such as in a server cluster, in a cloud computing environment or across peer computing systems.

The computing environment 700 may include a storage 710 for storing the neural network model 702. The storage 710 may include a magnetic storage device, an optical storage device or a combination thereof. The storage 710 may include solid state storage, hard drives, removable storage elements such as magnetic disks, optical disks, thumb drives, or the like. The storage 1104 may include RAM, ROM, and other varieties of integrated circuit storage devices. The storage may be a singular storage device or may include multiple devices located together or remotely from each other. The storage 710 may include non-transitory computer-readable storage media, such as the types of memory and storage described above. The non-transitory computer-readable storage media may include computer program instructions for realizing the functionality of the exemplary embodiments described above. These instructions may include those of the neural network model 702.

While the present application has been described with reference to exemplary embodiments herein, it will be appreciated that various changes in form and detail may be made without departing from the intended scope as defined in the appended claims.

What is claimed is:

1. A method, comprising:
   with a computing device, converting multi-dimensional color data encoded in a first color space for a set of pixels in an image into a single dimensional value for each pixel in the set of pixels;
   providing the single dimensional values for the pixels in the set of pixels as input into at least a portion of a first neural network; and
   with the at least a portion of the first neural network, converting the single dimensional color values of the pixels in the set of pixels into multi-dimensional color values in a second color space that is different than the first color space to produce a representation of the set of pixels in the second color space.

2. The method of claim 1, wherein the converting of the multi-dimensional color data is performed by a second neural network.

3. The method of claim 2, further comprising training the second neural network to perform the converting of the multi-dimensional color data.

4. The method of claim 2, wherein the second neural network used in the converting the multi-dimensional color data is part of the first neural network that converts the single dimensional color values.

5. The method of claim 4, wherein the second neural network is a convolutional variational autoencoder.

6. The method of claim 1, wherein the first color space is the RGB color space and the second color space is the LAB color space.

7. The method of claim 1, wherein the first color space or the second color space is one of a RGB color space, an LAB color space, an HSV color space, a CMYK color space, a YUV color space, a HSL color space, an ICtCp color space or a CIE color space.

8. The method of claim 1, wherein the multi-dimensional color values in the second color space are compressed relative to the multidimensional color values in the first color space.

9. The method of claim 1, wherein the set of pixels constitutes all or substantially all of the pixels of the image.

10. A method, comprising:
with a neural network executing on one or more computing devices, converting multi-dimensional color data encoded in a first color space for a set of pixels in an image into a single dimensional value for each pixel in the set of pixels; and
performing an image processing operation on the single dimensional values for the set of pixels, wherein the image processing operation produces a modified version of the single dimensional values and wherein the method further comprises converting the modified version of the single dimensional values into multidimensional values in a second color space.

11. The method of claim 10, wherein the image processing operation is one of segmentation, image classification, object classification, image filtering or image enhancement.

12. The method of claim 10, wherein the image processing operation is segmentation and wherein the method further comprises outputting likely segmentation of the image.

13. The method of claim 10, wherein the image processing operation is image classification or object classification and wherein the method further comprises outputting a likely classification of the image or a likely classification of an object in the image.

14. The method of claim 10, wherein the image processing operation and the converting of the modified version of the single dimensional values into multidimensional values in a second color space are performed by the neural network.

15. A non-transitory computer-readable storage medium for storing computer-executable instructions for execution by a processor to cause the processor to perform the following:
receive a set of image color data for an image encoded in a first color space;
create an embedded representation of the set of image color data in a latent space with a neural network;
train a first decoder to convert a representation of the set of image color data in a second color space from the embedded representation; and
train a second decoder to convert a representation of the set of image color data in a third color space from the embedded representation.

16. The non-transitory computer-readable storage medium of claim 15, further comprising using the first decoder to convert the representation of the set of image color data in the second color space from the embedded representation.

17. The non-transitory computer-readable storage medium of claim 16, further comprising using the second decoder to convert the representation of the set of image color data in the third color space from the embedded representation.

18. The non-transitory computer-readable storage medium of claim 15, wherein embedded representation is a representation of less data dimensionality than the received set of image color data.

19. The non-transitory computer-readable storage medium of claim 18, wherein the embedded representation has color data of a single dimension.

* * * * *